Figure 1:
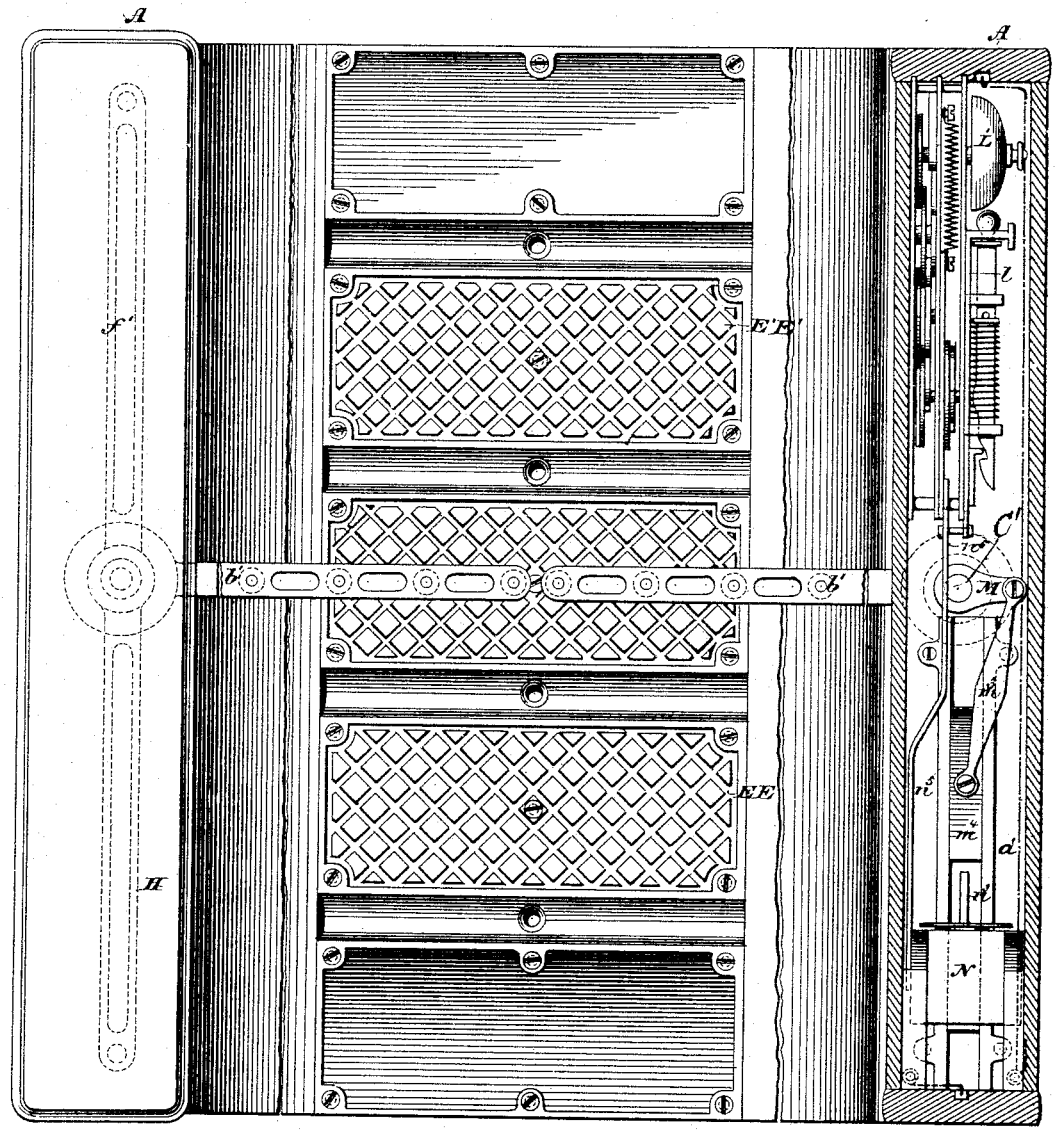

(No Model.) 12 Sheets—Sheet 1.

A. GAJARDO.
AUTOMATIC PASSENGER REGISTER.

No. 437,985. Patented Oct. 7, 1890.

WITNESSES:
Gustave Dieterich.
William Goebel.

INVENTOR
Adrian Gajardo (No Model.) 12 Sheets—Sheet 4.

A. GAJARDO.
AUTOMATIC PASSENGER REGISTER.

No. 437,985. Patented Oct. 7, 1890.

WITNESSES:
Gustave Dieterich
William Goebel.

INVENTOR
Adrian Gajardo (No Model.) 12 Sheets—Sheet 5.
A. GAJARDO.
AUTOMATIC PASSENGER REGISTER.
No. 437,985. Patented Oct. 7, 1890.
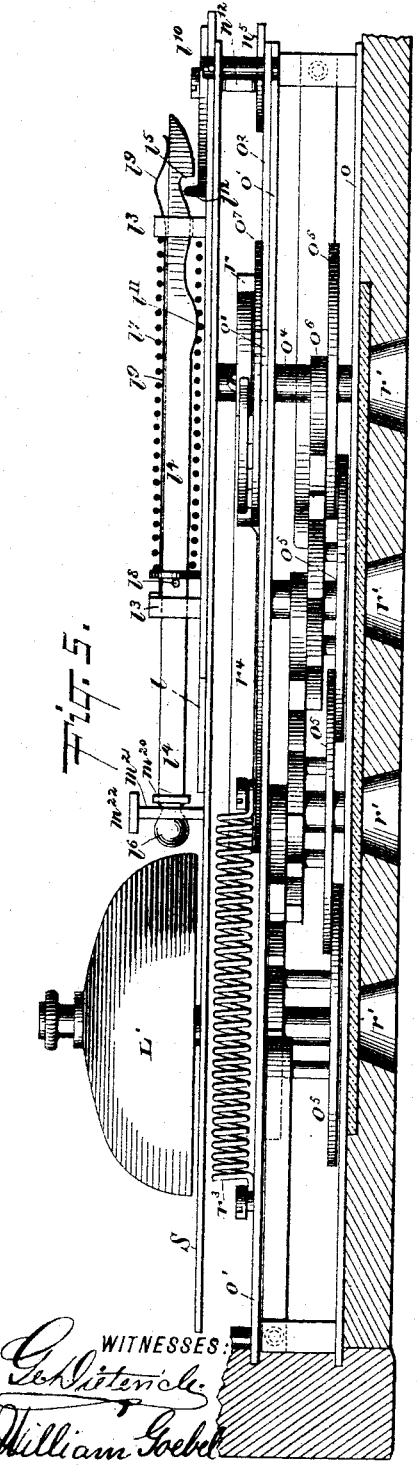
Fig. 5.
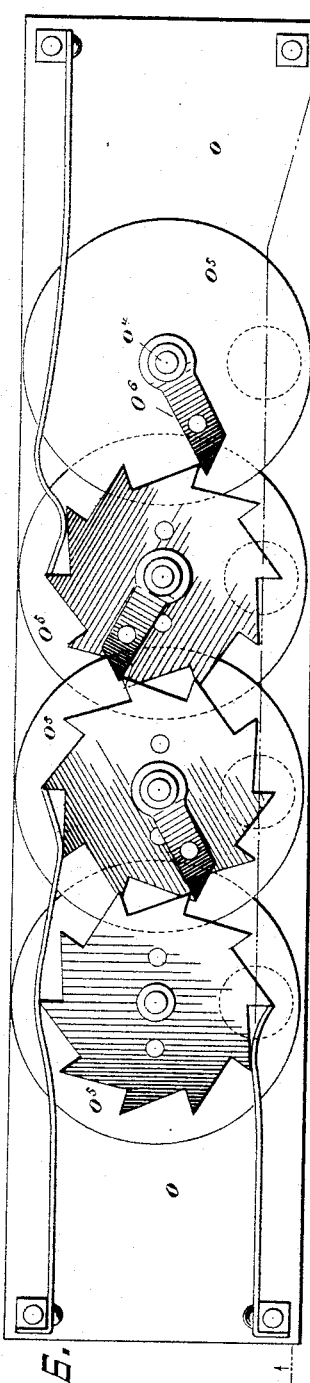
Fig. 6.
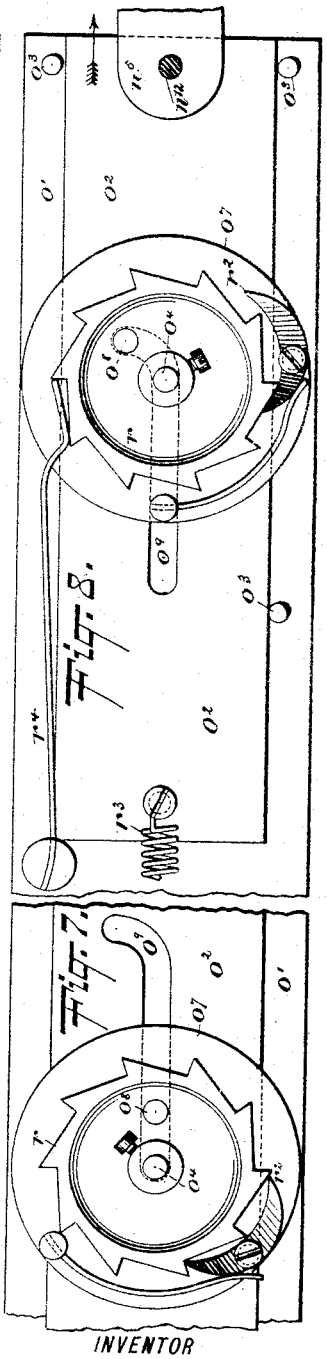
Fig. 8.
Fig. 7.
WITNESSES:
Geo. Dieterich
William Goebel
INVENTOR
Adrian Gajardo (No Model.) 12 Sheets—Sheet 6.
A. GAJARDO.
AUTOMATIC PASSENGER REGISTER.
No. 437,985. Patented Oct. 7, 1890.
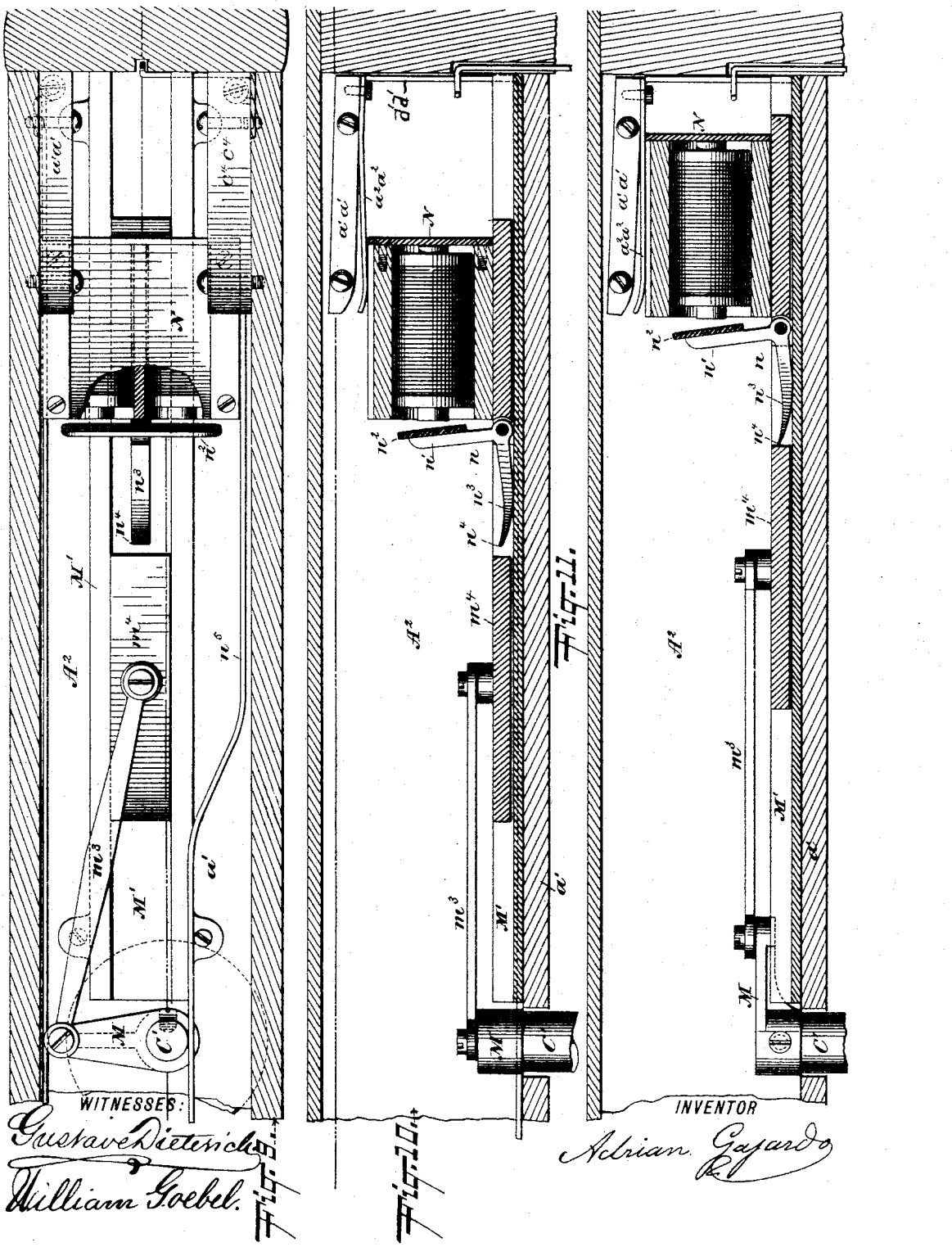

(No Model.)
12 Sheets—Sheet 7.
A. GAJARDO.
AUTOMATIC PASSENGER REGISTER.
No. 437,985. Patented Oct. 7, 1890.
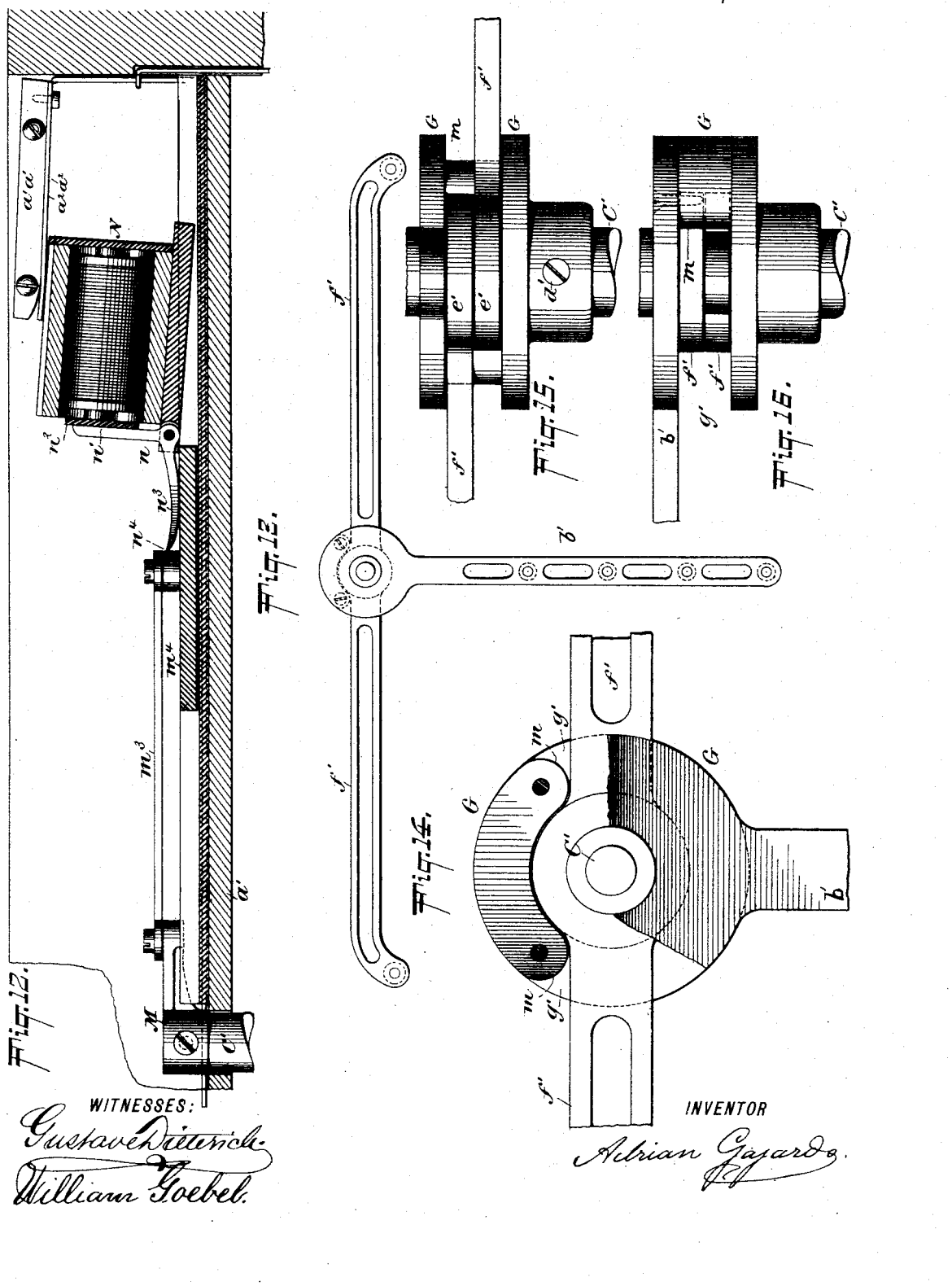
WITNESSES:
Gustave Dieterich
William Goebel
INVENTOR
Adrian Gajardo (No Model.)  12 Sheets—Sheet 8.
A. GAJARDO.
AUTOMATIC PASSENGER REGISTER.
No. 437,985.  Patented Oct. 7, 1890.
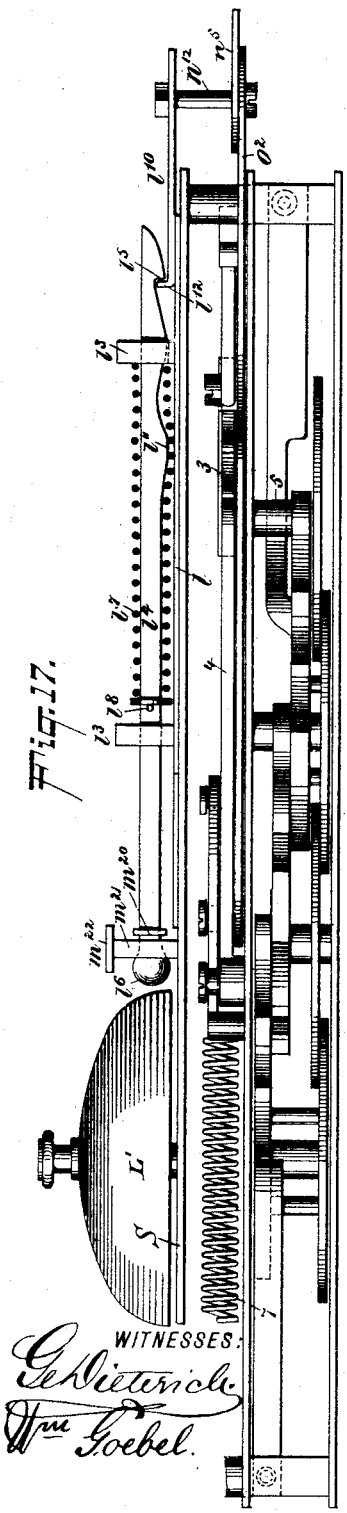
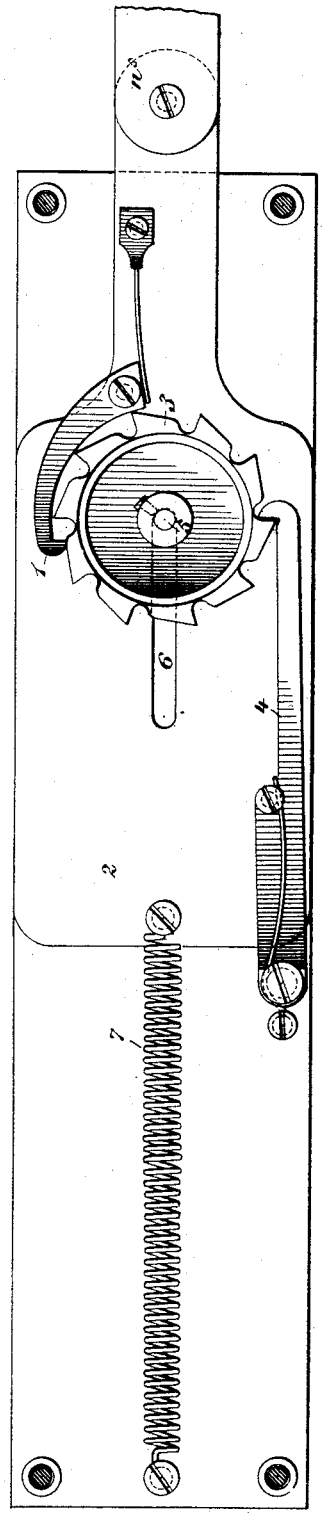
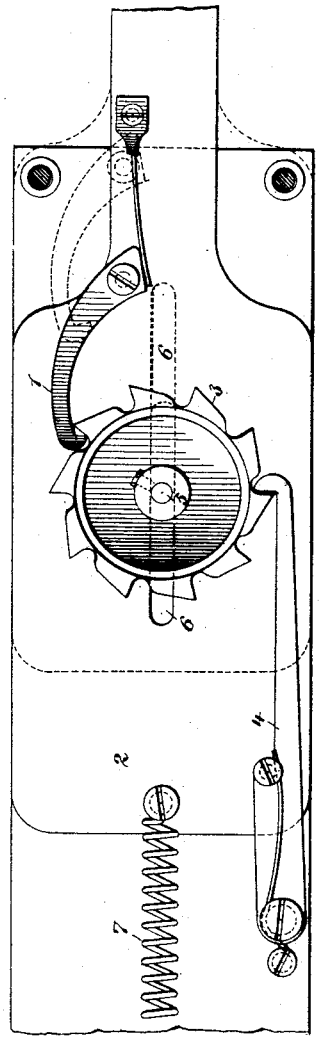
WITNESSES:
Ge. Dieterich.
Wm Goebel.
INVENTOR
Adrian Gajardo (No Model.) 12 Sheets—Sheet 9.
A. GAJARDO.
AUTOMATIC PASSENGER REGISTER.
No. 437,985. Patented Oct. 7, 1890.
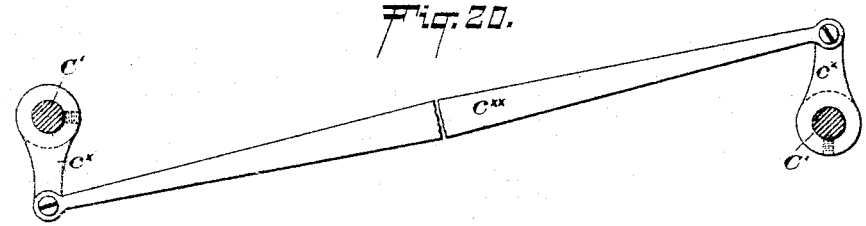
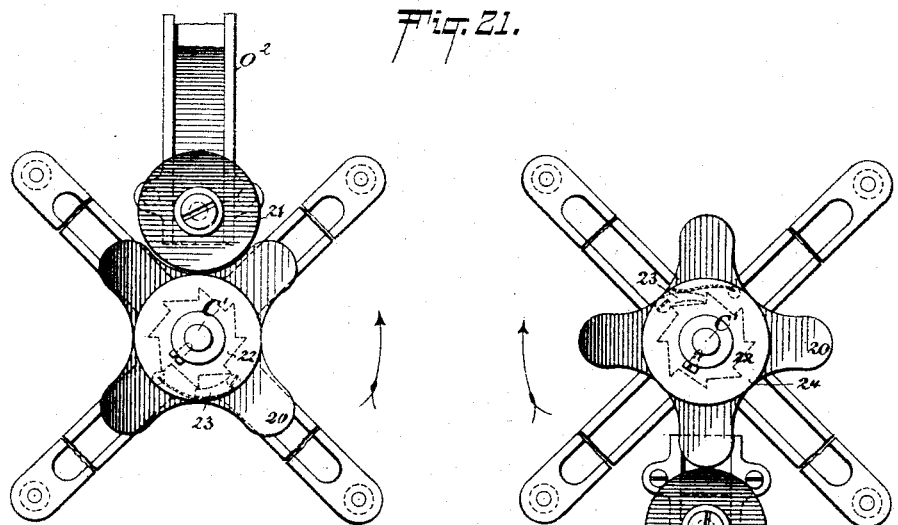
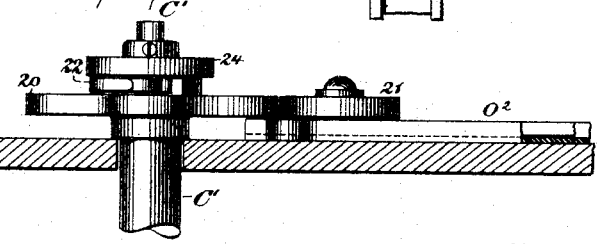
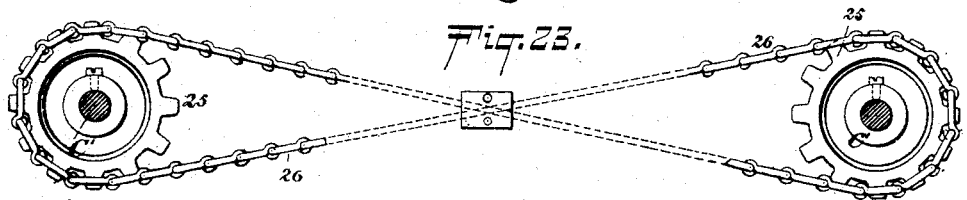
WITNESSES: INVENTOR
Gustave Dieterich Adrian Gajardo
William Goebel (No Model.)  
A. GAJARDO.  
AUTOMATIC PASSENGER REGISTER.  
No. 437,985. Patented Oct. 7, 1890.
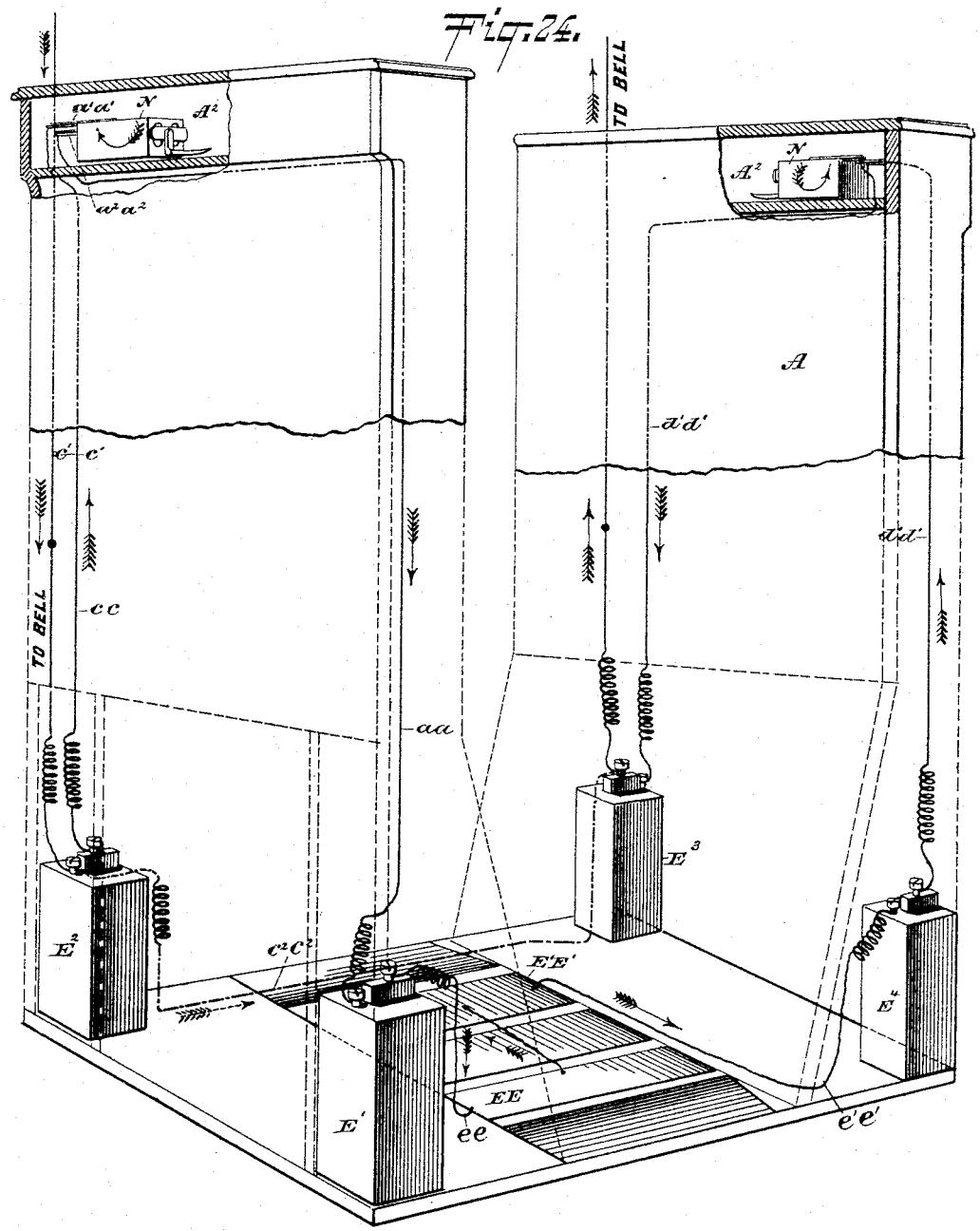

(No Model.)   12 Sheets—Sheet 11.

A. GAJARDO.
AUTOMATIC PASSENGER REGISTER.

No. 437,985.   Patented Oct. 7, 1890.

WITNESSES:
Gustave Dieterich
William Goebel

INVENTOR
Adrian Gajardo

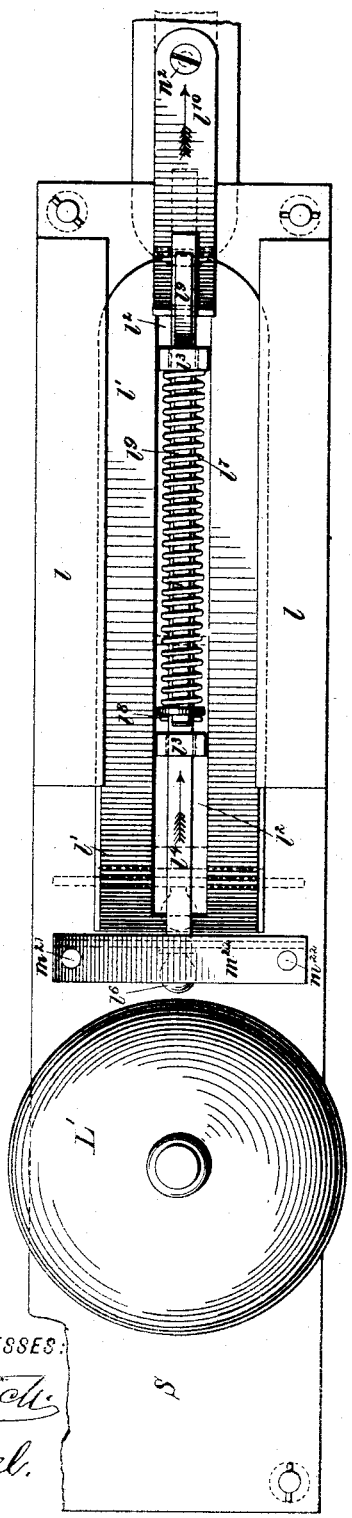
(No Model.) 12 Sheets—Sheet 12.
A. GAJARDO.
AUTOMATIC PASSENGER REGISTER.
No. 437,985. Patented Oct. 7, 1890.

UNITED STATES PATENT OFFICE.

ADRIAN GAJARDO, OF VALPARAISO, CHILI.

AUTOMATIC PASSENGER-REGISTER.

SPECIFICATION forming part of Letters Patent No. 437,985, dated October 7, 1890.

Application filed August 4, 1890. Serial No. 360,966. (No model.)

*To all whom it may concern:*

Be it known that I, ADRIAN GAJARDO, a citizen of the Republic of Chili, and a resident of Valparaiso, in the Province of Valparaiso, and Republic of Chili, have invented certain new and useful Improvements in Automatic Passenger-Registers, of which the following is a specification.

My invention relates to an improvement in automatic passenger-registers, the object being to provide a device of this character which shall automatically register the number of persons passing into and out of street or railroad cars, fair-grounds, and all other places where it is desired to accurately register the number of persons passing into or out of an inclosure, and by means of which it shall be impossible for an employé or attendant to be dishonest in reporting the true or actual number of persons passing into or out of such inclosure from whom he shall be required to collect fares or tolls.

A further object of my invention is to provide an automatic passenger-register which shall properly and correctly register the number of persons passing into and out of an inclosure and at the same time allow of the conductor or other proper official to pass into and out of the door or gates without registering such passage, and, further, to so construct the device that the instrumentalities employed for registering the number of persons or passengers and those provided to allow of the passing of the proper officials shall be entirely out of the control of the latter, thereby rendering it possible in many instances to reduce the force or number of employés engaged in selling and receiving tickets and collecting tolls, and doing away entirely with those employés engaged to watch or check the conductors, and usually known and referred to as "spotters." In many instances, in the case of street and railroad cars, the entrance and exit door is changed from one end of the car to the other at the ends or termini of the route, and to prevent the necessity of providing each car with two devices, one at either end, it has been my object and purpose to so construct my improved device that it shall be capable of being moved from one end to the other. It is obvious that by this construction the device may also be transported from place to place—that is, from, say, one fair-ground to another, from one gate or entrance to another, or, if desired, from one city to another.

A further object of my invention is to so construct my improved passenger-register that the fewest number of parts may be employed in order that it shall be simple and economical in its construction, not liable to get out of order, and capable of being manufactured at a small cost.

With these ends in view my invention consists of certain novel features of construction and combinations of parts, as will be hereinafter fully described, and pointed out in the claims.

Figure 2:
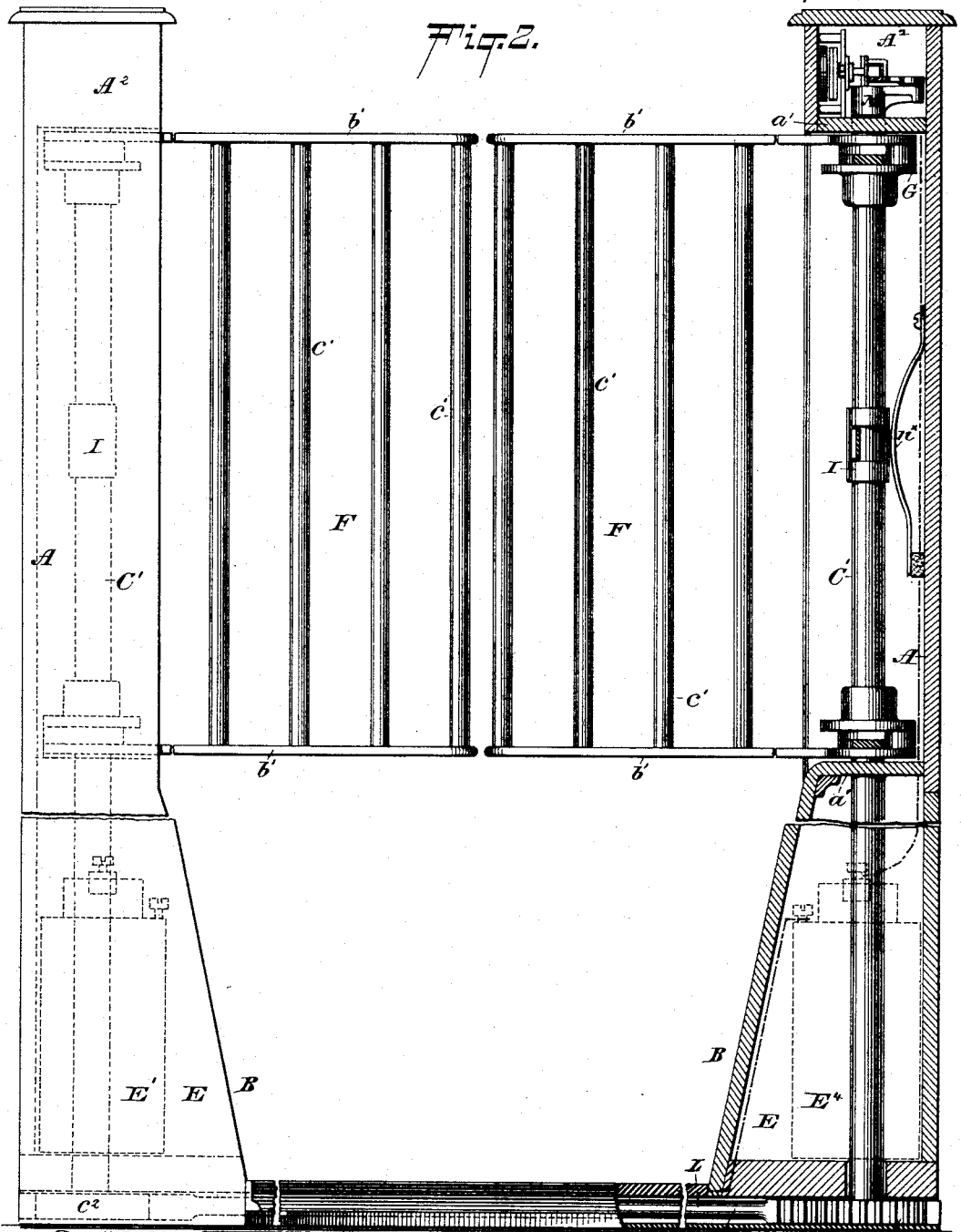
Figure 3:
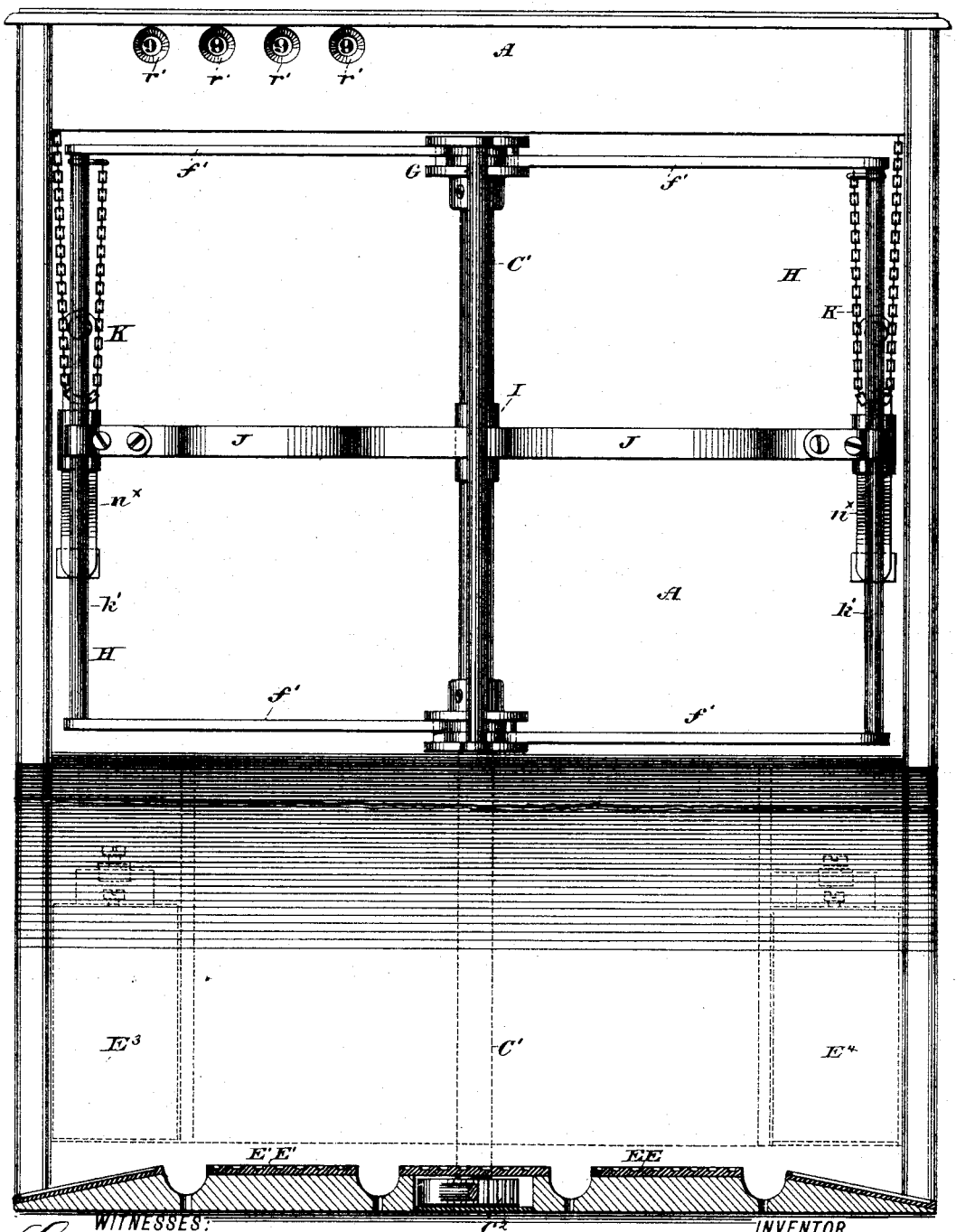
Figure 4:
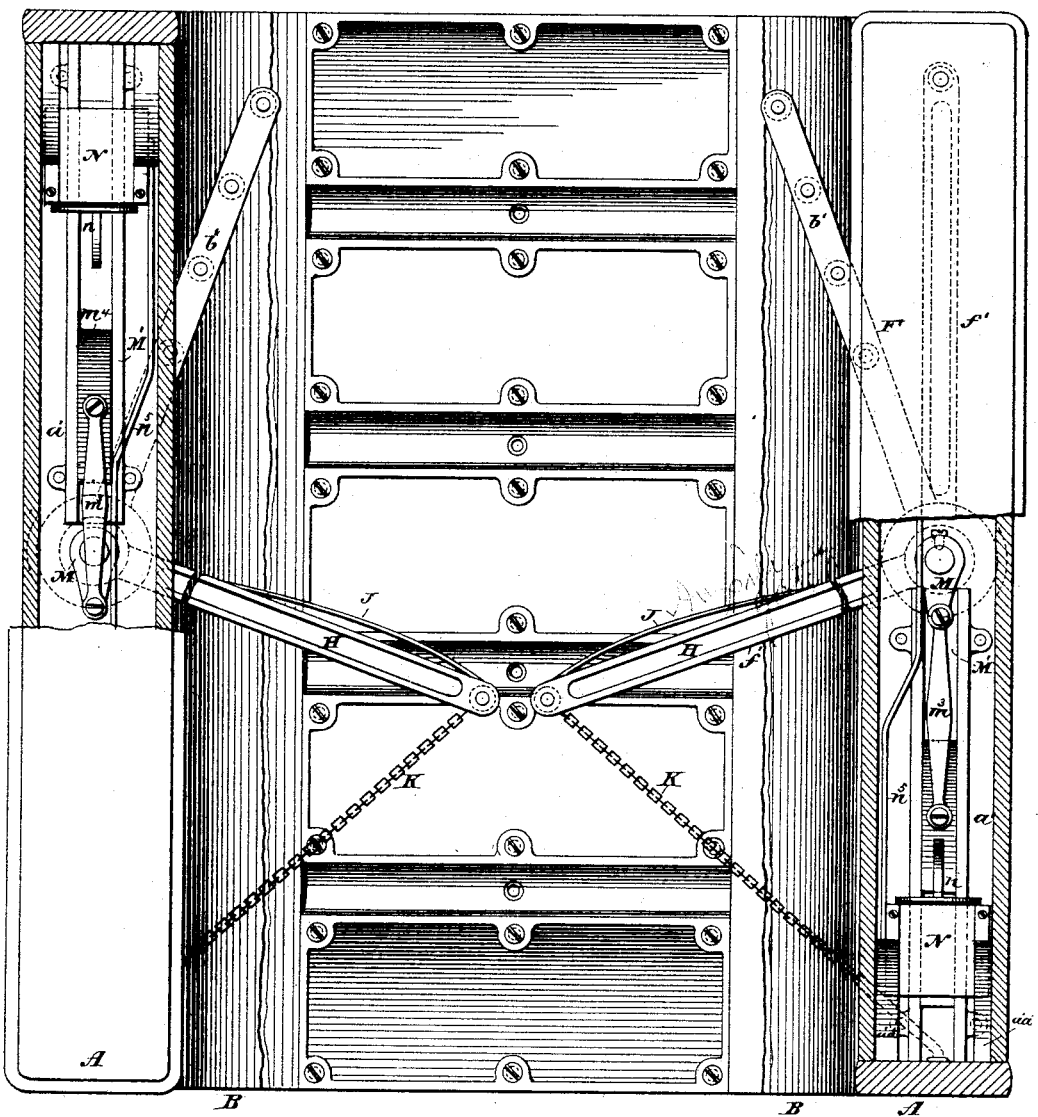
Figure 25:
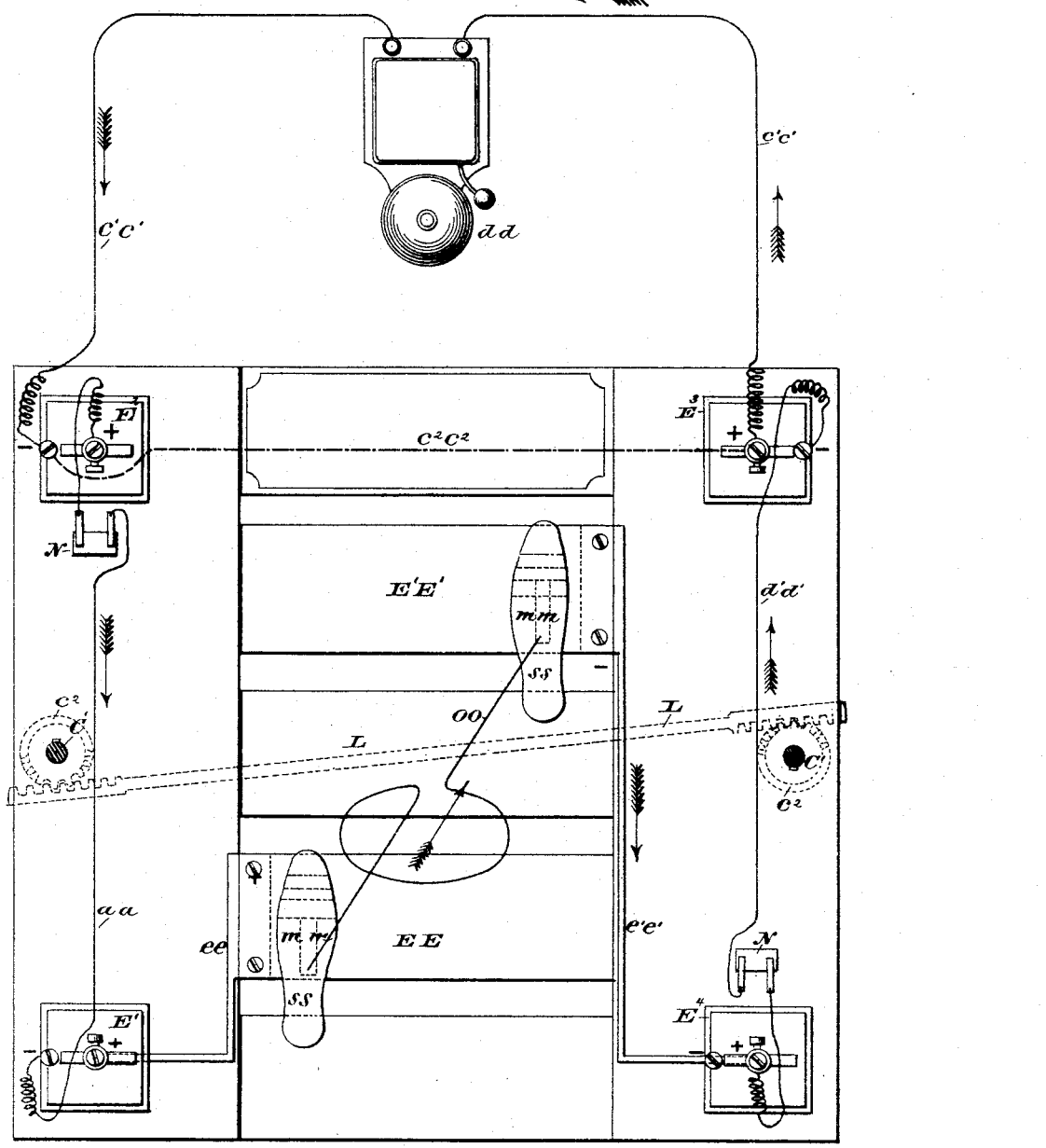

In the accompanying drawings, Figure 1 is a top plan view of my improved device, the cover or lid on one of the sides being removed to show the registering mechanism of its respective gate. Fig. 2 is a side view of the same, partly in elevation and partly in section. Fig. 2$^a$ is a view of the collar or sleeve employed to hold the spring of the auxiliary gates against the shafts of the primary gates. Fig. 3 is a view in side elevation of one pair of auxiliary gates. Fig. 4 is a plan view showing the relative positions of the primary and auxiliary gates after the former have been opened, and also showing the relative positions of the several parts when the gates are opened to allow the employé to pass without registering. Fig. 5 is a detached plan view of the registering mechanism. Figs. 6, 7, and 8 are detail side views of the same projected from Fig. 5. Fig. 9 is a plan view showing the positions of the sliding electro-magnet and its operating sliding plate when the gates are closed. Fig. 10 is a sectional view of the same. Fig. 11 is a similar view showing the relative positions of the magnet, armature, and sliding plates when the gates are opened by or for a passenger and when a registration is made of such. Fig. 12 is a similar view of the same parts when the gates are opened by the conductor and when no registration is made. Fig. 13 is a detached plan view of the primary and auxiliary gates. Figs. 14, 15, and 16 are detail views of bearings formed on the primary gates for the reception of the ends of the auxiliary gates. Fig. 17 is a detached plan view of a modified form of the registering mechanism. Figs. 18 and 19 are detail side views of the same projected from Fig. 17. Fig. 20 is a plan view of a modification, showing a connecting-rod to be placed below the device and connect the shafts of the primary gates to cause them to open or close simultaneously. Figs. 21 and 22 are views of the gates when constructed in the form of turnstiles. Fig. 23 is a view of a chain and sprocket-wheels to be attached to the shafts when turnstiles are employed in lieu of gates for causing them to rotate simultaneously. Figs. 24 and 25 are perspective and plan views, respectively, showing the arrangement of the batteries and wires. Fig. 26 is a plan view of the bell and operating parts attached to the registering mechanism. Fig. 27 is a plan view of a modification, showing a second register secured to the device.

A represents the sides of the gate or passage way, consisting, preferably, of upright wooden structures for inclosing the operating parts of the device, the lower ends B of these wooden structures being enlarged by inclining them inwardly, the purpose being to form a box or receptacle E at each of the four corners to contain batteries E' $E^2$ $E^3$ $E^4$, hereinafter referred to, and also to form the passage-way of such a width that two persons will not be able to pass through side by side. In these wooden sides A revolve the shafts C', the lower ends of which are cone-shaped and bear on metal plates (not shown) secured to the flooring, said shafts passing through and held in their upright positions by means of cross-pieces $a'$. To these shafts are secured the primary gates F, preferably made of metal, and consisting of the upper and lower horizontal pieces $b'$ and the vertical rods $c'$. On the ends of the horizontal rods $b'$ are formed or secured the bearings G, slotted horizontally for the purpose as hereinafter described. The gates F are held in their proper positions upon the shafts C' by means of the set-screws $d'$, passing through the bearings and entering the shafts, as shown in Fig. 15.

H represents a pair of auxiliary gates secured to each of the shafts C', the enlarged ends $e'$ of the horizontal pieces $f$, fitting in the slots $g'$, formed in the bearings G, the said enlarged ends $e'$ being provided with openings through which the shaft C' passes.

To the shafts C', and preferably about midway their length, is placed the metal collars or sleeves I, provided with the slots $i'$, through which pass the strap-springs J, the ends of which are securely fastened to the vertical rods $k'$ of the auxiliary gates, the tendency of which springs is to keep the primary gates F closed, and to retain the auxiliary gates H open and back against the sides, as shown in Fig. 3 of the drawings. It will be understood from this construction and arrangement of parts that when the gates F are opened in either direction, the auxiliary gates on one side bear or strike against the shoulder $m$, formed by slotting the bearings G, and are brought forward and assume substantially the same relative positions as did the gates F, those auxiliary gates on the opposite side remaining stationary against the sides A, as shown in Fig. 4. When the gates F are opened in the opposite direction, the opposite set of auxiliary gates open in the same way, the first pair remaining stationary, the object of this arrangement being to allow but one person to pass in or out at a time, and thus prevent the gates F after one person has entered, from being held open to allow a second person to enter without being registered.

After a person has passed through the gates F, the spring J, which has been bent or curved by reason of its attachment, as above described, will return the auxiliary gates to their normal positions, as shown in Fig. 3—that is, back against the sides A—and as the horizontal bars $f'$ strike against the shoulders $m$ of the bearings G the primary gates F will also be returned to their normal closed position, it being evident that as said gates F are rigidly secured to the shafts C' the latter will always be partially revolved when the gates are opened. In order to prevent the possibility of the auxiliary gates on one side of the shaft being turned around against the gates F after the latter have been opened to their fullest extent, I provide chains K, securely fastened to the sides A at one end and at their opposite ends to the auxiliary gates, said chains being of such length as not to allow said auxiliary gates to be so far opened as to permit a person to pass through them when the gates F are open, as shown in Fig. 4. In order, therefore, to allow a second person to pass through the gates F, the auxiliary gates must be allowed to swing back against the sides A, which action, as before described, simultaneously closes the gates F, as shown in Fig. 1.

In order to prevent the auxiliary gates, when closed, from striking the wooden sides A, I secure to the latter the springs $n^x$, against which they strike without jar or noise, as shown in Figs. 2 and 3.

To the lower ends of the shafts C' are secured the pinions $c^2$, which gear with the teeth formed on the ends and opposite sides of the rack-bar L, extending across the base of the device. The purpose and effect of this construction and arrangement are to cause both gates to open and close simultaneously. Instead, however, of employing these devices, crank-arms $c^x$ may be formed on or secured to the lower ends of the shafts C' and the connecting-rod $c^{xx}$ pinned or otherwise secured thereto, as shown in Fig. 20 of the drawings.

In the upper portion of the sides A, I form the receptacles $A^2$, as shown in Figs. 2 and 24, in which is placed the recording mechanism contained between the two plates $o$ $o'$, and which consists of a train of wheels arranged in a manner similar to other registers now in common use, openings being cut in the outer plate which register with similar openings $r'$ made in the side A, and through which the numbers on the dials may be seen, as shown in Figs. 3 and 5. These registers, it will be hereinafter noticed, are placed in the diagonally opposite corners of the boxes $A^2$, and are so connected with the gates that one gate will register when opened in one direction and the other gate register when opened in the opposite direction, the object and purpose of this arrangement being that in case one register should accidentally become or purposely be made inoperative the other will cause the person to be registered either when passing in or out. On the outer plate $o'$ slides the plate $o^2$, guided in its horizontal movements by the pins $o^3$. Through the plates $o$ $o'$ $o^2$ passes the shaft $o^4$, to which is secured, between the plates $o$ and $o'$, the first disk $o^5$ and the pawl $o^6$, which latter by revolving with the shaft $o^4$ operates the train of ratchets and disks of the registering mechanism, all as shown in Figs. 5, 6, 7, and 8, which train may be as long as desired; but I have found that four disks $o^5$, representing units, tens, hundreds, and thousands, will generally suffice for most purposes. On the shaft $o^4$ is loosely mounted the disk $o^7$, provided with a lug $o^8$ fitting in the curved slot $o^9$ formed in the sliding plate $o^2$. To this shaft $o^4$ is also secured the ratchet $r$, which revolves therewith, and to the revolving disk $o^7$ is secured the spring-actuated pawl $r^2$, operating in connection with said ratchet $r$. The operation of these parts is as follows: When the plate $o^2$ is pulled in the direction as indicated by the arrow, (see Fig. 8,) the disk $o^7$ is revolved one tooth by reason of the lug $o^8$ thereon working within the curved end of the slot $o^9$ in the plate $o^2$. This partial rotation of the disk also revolves the ratchet $r$ through the intervention of the pawl $r^2$. After the disk $o^7$ has been rotated to a certain extent—that is, to the next tooth in the ratchet, as shown in Fig. 7—the lug $o^8$ reaches the horizontal portion of the slot $o^9$, thus allowing the plate $o^2$ to be pulled outwardly until the end of the slot $o^9$ strikes the shaft $o^4$, and this without turning or revolving the latter or the parts connected thereto. Upon releasing the plate $o^2$ it is returned to its original position by means of the spring $r^3$, one end of which is secured to said plate $o^2$ and the other end to the plate $o'$, the disk $o^7$, by means of the lug $o^8$ and curved slot $o^9$, being also returned to its original position, causing the pawl $r^2$ to engage with the next tooth in the ratchet $r$, the latter being prevented from rotating backwardly by reason of the dog $r^4$, secured at one end to the plate $o'$ and having its opposite free end engaging with the teeth of the ratchet $r$.

Although I prefer to use the above operating mechanism, I do not intend to limit my claim to such, as the particular construction and form of the several parts may be modified and still operate effectually—as, for instance, in Figs. 17, 18, and 19 of the drawings I have shown a modification wherein the spring-actuated pawl 1 is secured to the sliding plate 2, and when the latter is pulled forward turns the ratchet 3, the spring-actuated dog 4 being in this instance placed at the top, the sliding plate 2 being guided in its horizontal movements by means of the shaft or spindle 5 of the ratchet 3 working in the straight elongated slot 6, formed in the sliding plate 2, the spring 7 being employed, as in the former instance for returning the plate 2 to its original position. After the ratchet 3 has been rotated one notch or tooth the plate 2 continues to slide outwardly, as shown in dotted lines in Fig. 19, until the end of the slot 6 strikes the shaft 5. This for the purpose of allowing the gates to be opened to their fullest extent. A bell with its operating mechanism will be attached to this form of device, in every way the same as in the case of the device first above described, which is as follows: In order to give notice when a person passing through the gate is registered, I provide a bell $L'$, constructed and arranged as follows: To the inner plate $o'$ is secured the plate S, provided at one end with a bell $L'$. To this plate are secured the horizontal guide rods or strips $l$, between which slides the plate $l'$, provided centrally with a longitudinal slot $l^2$ extending nearly its entire length. To the plate S and projecting through the slot $l^2$ are the bearings $l^3$, in which slides the rod $l^4$, provided on one end with a catch or shoulder $l^5$, Figs. 5 and 17, and on its opposite end with a knob or ball $l^6$, for striking against the bell $L'$. Between these bearings $l^3$ and around the rod $l^4$ is coiled the spring $l^7$, one end bearing against the forward bearing $l^3$ and the opposite end bearing against a pin or lug $l^8$, secured to the rod $l^4$, the object and purpose of the spring being to cause the rod when pulled forward, as indicated by the arrow in Fig. 26, to fly back and cause the knob $l^6$ to strike the bell $L'$. To the rod $l^4$ is secured the flat spring $l^9$, Fig. 5, which is slightly bent outwardly and passes through and bears against the bearing $l^3$ for the purpose of retaining the shoulder or catch $l^5$ in engagement with the bent end $l^{12}$ of the rod $l^{10}$, secured to the sliding plate $l'$. On the under side of the rod $l^4$ and a short distance from the bearing $l^3$ is formed the curved shoulder or enlargement $l^{11}$, the effect of which is when the rod $l^4$ is pulled forward the shoulder $l^{11}$ in passing through the bearing $l^3$ forces the rod $l^4$ upwardly and releases the catch or shoulder $l^5$ from engagement with the bent end $l^{12}$ of the rod $l^{10}$, the forward end of the latter being secured to the sliding plate $o^2$ and the lever or rod $n^5$ by means of the post $n^{12}$. It will now be understood that when the sliding plate $o^2$ is pulled forward, the rod $l^{10}$ being secured thereto, the latter is also pulled forward, and by reason of the bent end $l^{12}$ of the rod $l^{10}$ engaging with the shoulder or catch $l^5$ on the rod $l^4$ the latter is pulled forward until the shoulder $l^{11}$ strikes or passes through the bearing $l^3$, whereupon, as before described, the rod $l^4$ is released, and by reason of the spring $l^7$ flies backwardly and sounds the bell L', the shoulder $l^{11}$ being formed on the bar $l^4$ at such a point that the latter is released and the bell sounded simultaneously with the registering of a passenger caused by pulling the sliding plate $o^2$ forward, as hereinbefore described.

In order to cause the ball $l^6$ to recede from the bell L' after striking the same, I secure to the bar $l^4$ the spring-plate $m^{20}$, which, when the rod $l^4$ is forced backwardly in the direction toward the bell by means of the coiled spring $l^7$, strikes the two posts $m^{21}$, secured to the plate S and connected by the cross-piece $m^{22}$, the spring-plate $m^{20}$ allowing the rod to recede sufficiently far to cause the ball to strike the bell, but immediately withdrawing it from contact therewith.

In order to operate the registering mechanism by pulling forward the sliding plate $o^2$, as described, I secure to the upper end of each shaft C' a crank-arm M, (see Figs. 1 and 2,) to the free end of which is secured the connecting-rod $m^3$, which in turn is connected with the plate $m^4$, sliding in the grooved plate M', located in the receptacle $A^2$. On this grooved plate also slides the electro-magnet N, having hinged thereto the bell-crank $n$, the vertical arm $n'$ of which carries the armature $n^2$, and the horizontal arm of which $n^3$ has its end $n^4$ slightly turned upwardly, in order that when the armature $n^2$ is attracted by and held against the electro-magnet N the arm $n^3$ will be slightly raised, in order to allow the slide $m^4$ to be forced under it, as shown in Figs. 4 and 12. To the magnet N is secured one end of a lever or rod $n^5$, the opposite end of which is connected to the sliding plate $o^2$. The operation of these parts is as follows: When the gates are opened, the shaft C' is turned, which through the intervention of the crank-arm M and connecting-rod $m^3$ forces the slide $m^4$ along the grooved plate M' until it strikes the end of the horizontal arm $n^3$ of the bell-crank $n$. As the gates continue to open, the slide $m^4$ pushes the magnet along, as shown in Fig. 11, and which magnet being connected with the sliding plate $o^2$ by the connecting-rod $n^5$ causes the plate $o^2$ to be pulled forwardly and the registering mechanism operated. When the gates are released, the spring J causes the gates and operating mechanism to resume their original positions. When the gates are opened in the opposite direction, the register and its mechanism on the opposite side will be operated, the slide $m^4$, connected with the gate first mentioned, being pulled away from the magnet, as shown on left-hand side of Fig. 4, and thus preventing a registration on both sides when the gates are opened, and at the same time allowing of a registration to be made on one side when the gates are opened in one direction, and on the opposite side when the gates are opened in the opposite direction.

It will now be understood from the foregoing description that every time the gates are opened a registration is made of such. In order, however, to allow the conductor or other proper official to pass through the gates without registering, I provide batteries E' $E^2$ $E^3$ $E^4$, located as before mentioned. To the positive pole of the battery E' is connected, by a wire or metal strip $e$ $e$, a brass or copper plate E E, and to the negative pole of the battery $E^4$ is connected, by a similar wire or metal strip $e'$ $e'$, the plate E' E', which plates extend entirely across the wooden floor of the device. To the negative pole of the battery E' is attached the end of the wire $a$ $a$, the opposite end of which is connected to a metal bar $a'$ $a'$, having secured thereto a spring-plate $a^2$ $a^2$, secured to the wooden side A and bearing on the electro-magnet N, a second similar spring-plate (not shown) being secured to the bar $c^4$ $c^4$, Fig. 9, which latter is connected with a wire $c$ $c$, passing down and connected with the positive pole of the battery $E^2$, which battery is connected with the battery $E^3$ by means of the wire $c'$ $c'$, Fig. 24, having attached thereto the electric bell $d$ $d$. If desired, however, the bell may be omitted, and the wire stretched directly from one battery to the other, as shown at $c^2$ $c^2$. The opposite poles of the batteries $E^3$ and $E^4$ are connected by the wires $d'$ $d'$, the contact being made with the magnets N in the same way as upon the other side, thus leaving the circuit broken only between the plates E E and E' E'. In order to complete the circuit, the conductor or other official has about his person (preferably around his waist,) a wire or other suitable electrical conductor O O, the ends of which are connected to plates $m$ $m$, attached to his shoes $s$ $s$. In passing through the gates F the conductor steps upon the plates E E E' E', which completes the circuit. The magnet N in such case attracts the armatures $n^2$, raising the arms $n^3$, which when the gates are opened allows the slide $m^4$ to pass under the arm $n^3$, as shown in Figs. 4 and 12, thereby preventing the magnet from being moved, and preventing a registration being made of his opening the gates. When the circuit is completed, the electric bell $d$ $d$ gives a signal to those inside the car, warning the passenger of the entrance of the conductor and of the entrance of any other person without being registered. Instead of so widely separating the plates E E and E' E', it is obvious that they may be placed closer together, and a plate attached to one shoe only of the conductor, (not shown,) in order that he may step on both plates at one time, and thus complete the circuit and pass through the gates without registering; but by thus arranging the parts it might be possible for the conductor or other official in charge to so place his foot, open the gates, and then allow a person to pass without being registered, but by causing him to stand close to the gates and employ both feet for completing the circuit, as first described, this is not possible.

It will be obvious to those skilled in the art that by simple and unessential changes or modifications of the parts my invention may be applied to stairways leading from the lower floor of a car to an upper floor, the plates E E and E' E' in those instances being made to move vertically, as is the case with those devices of similar character, and which need not here be shown or set forth in detail. The gates or doors F may also be changed, modified, or varied, as desired, the form or style of gate somewhat depending upon the purpose for which the device is to be used. It may be desired in some instances, especially where large crowds or numbers of persons are to be allowed to pass without delay, to omit the auxiliary gates. In such instances, and where room will permit of the same, I prefer to use the form of gates as shown in Figs. 21 and 22 of the drawings—that is, one form of turnstile of which C' and C' are the shafts, having loosely secured thereto the cam 20, which when the stiles are revolved strikes the wheel-bearing 21, secured in the end of the sliding plate $o^2$, and forces the same backwardly and operates the registering mechanisms, as before described, said cam having secured thereto the ratchet 22, with which engages the pawl 23, secured to the under side of the disk 24, secured tightly to the shaft C', this arrangement of parts allowing the shaft to be reversed without operating the cam and slide $o^2$. The lower ends of these shafts have secured thereto the sprocket-wheels 25, connected by the twisted chain 26 for the purpose of causing the two stiles to work in unison, all being arranged for one stile to register when opened in one direction and the other in the opposite direction.

In Fig. 27 I have shown a second register attached to my device, as it may in many instances be desirable, especially when my improved register is used at the stations of elevated roads, ferries, fair-grounds, or other places where it is intended to be made stationary to not only register in the device itself, but to have it simultaneously register at some distant place, as in the office of the superintendent or other place where it may be desirable to ascertain at any time the state of the register without the necessity of referring to the device itself. To accomplish this end, I secure to the wooden vertical side 30 the two metal plates 31, connected to the batteries, and having fitted therein the horizontal sliding pins or bars 32, each of the latter having coiled around them the springs 33. To each of these plates 31 are secured the ends of the wires 34, connected to the electro-magnet 35, located near a suitable register 40, which in turn may be located at any point desired. 36 represents the armature of the magnet 35, which armature is secured to the operating-lever 37, adapted, when pulled toward the magnet, to operate the register numbered 40. To the insulated box containing the magnet N is secured the plate 41, which, when the magnet N is forced backwardly by reason of a person passing through the gates F, as hereinbefore described, strikes against the yielding pins or bars 32, thereby completing the circuit through the plate 41 by reason of its touching the ends of said pins or bars 32, the effect being to send the current through the magnet 35, which attracts the armature 36 and operates the registering mechanism in the register 40. When the gates F are released after a person has passed through them, the magnet N returns to its normal position, thereby breaking the circuit between the pins 32 and allowing the armature 36 to be raised and also assume its normal position. This operation is of course repeated each and every time the gates F are opened to allow a passenger to pass through them; but in the case of the conductor or other official passing through the gates F, the magnet N remaining stationary, as before described, the plate 41, not coming in contact with the pins 32, leaves the circuit to the register 40 broken and prevents a registration in the latter of the passage of the conductor through the gates F.

What I claim is—

1. A passenger-register containing two stepping-plates connected with opposite poles of a battery or batteries, registering mechanism, and a wire or instrument to be carried by the conductor or other official for connecting said stepping-plates and preventing the operation of the registering mechanism, substantially as described.

2. A registering-instrument containing two stepping-plates connected to batteries, a magnet included in the circuit and connected with the registering mechanism, and means for rendering said registering mechanism inoperative, substantially as described.

3. A registering-instrument constructed with two stepping-plates, batteries having wires connecting them with said plates, registering mechanism, and an electro-magnet included within the circuit to cause and to prevent the operation of the registering mechanism accordingly as said plates are electrically disconnected or connected, substantially as described.

4. A passenger-register constructed with doors or gates and having suitable registering mechanism connected therewith and operated thereby when opened, batteries having wires connecting their poles with two stepping-plates, and an electro-magnet connected with said registering mechanism for allowing the gates or doors to be opened without registering when said stepping-plates are electrically connected and the circuit completed, substantially as described.

5. A passenger-register constructed with a sliding electro-magnet, suitable registering mechanism, and gates adapted, when opened, to move said magnet and operate said register, substantially as described.

6. A passenger-register containing and constructed with a sliding electro-magnet provided with an armature, a suitable register, batteries and wires for sending a current through said magnet, gates arranged, when opened, to move said magnet and operate said register, and means for closing the circuit and raising said armature and allowing the gates to be opened without registering, substantially as described.

7. A passenger-register constructed with gates and foot-plates, the former connected with suitable recording mechanism and adapted to operate the same when opened, batteries connected with said plates, and a wire or other device to connect said plates and allow said gates to be opened without registering, substantially as described.

8. A passenger-register constructed with gates secured to rock-shafts, registering mechanism operated by said shafts, batteries connected with stepping-plates and to an electro-magnet connected with said registering mechanism, and a wire or other device for connecting said plates and completing the circuit, whereby the gates may be opened without registering, substantially as described.

9. A passenger-register constructed with rock-shafts having gates or doors secured thereto, an electro-magnet secured to suitable registering mechanism, and a sliding plate secured to said shafts for moving said magnet and operating said registering mechanism, substantially as described.

10. A passenger-register constructed with rock-shafts having gates or doors secured thereto, a sliding magnet adapted to be moved by a sliding plate connected with said shafts when the gates are opened, registering mechanism secured to the magnet, stepping-plates connected to batteries, and a wire or other device for connecting said plates and raising the armature of the magnet, whereby the latter will remain stationary when the gates are opened, substantially as described.

11. In a passenger-register, the combination, with rock-shafts having gates or doors secured thereto, of a sliding electro-magnet connected with suitable registering mechanism and a sliding plate secured to said shaft for moving said magnet horizontally when the shafts are rotated, substantially as described.

12. In a passenger-register, the combination, with rock-shafts having gates or doors secured thereto, of a sliding electro-magnet connected with suitable registering mechanism, an armature secured to a bell-crank, and a sliding plate secured to said rock-shafts, adapted to strike said crank, move the magnet, and operate the registering mechanism, substantially as described.

13. In a passenger-register, the combination, with rock-shafts having doors or gates secured thereto, of batteries and electro-magnets connected therewith, said magnets being provided with armatures and attached to bell-crank levers, stepping-plates also connected with said batteries, registering mechanism connected with said magnets, a sliding plate attached to said rock-shafts for moving said magnets and operating the registering mechanism, and a wire or other device for completing the circuit through said plates and raising said bell-crank, allowing the magnets and registering mechanism to remain stationary when the gates are opened.

14. In a passenger-register, the combination, with doors or gates secured to rock-shafts, of electro-magnets connected to suitable registering mechanism and to batteries, stepping-plates also secured to the batteries, and armatures secured to bell-crank levers, the horizontal arms of which are raised when the circuit is completed and lowered when the circuit is broken, of sliding plates secured to said rock-shafts and adapted to strike the horizontal arms of said bell-cranks when lowered and to slide below the same when they are raised and a wire or other device for connecting said stepping-plates to complete the circuit and allow the gates to be opened without registering.

15. In an automatic passenger-register, the combination, with gates secured to rock-shafts, of the sliding electro-magnets N, the bell-crank levers $n$, armature $n^2$, suitable registering mechanism connected to said magnets and adapted to be operated when the latter is moved horizontally, and means secured to said rock-shafts for moving said magnets when the gates are opened, substantially as described.

16. In an automatic passenger-register, the combination, with gates F and rock-shafts C′, of sliding electro-magnets N, bell-crank $n$, and the sliding plate $m^4$, connected to said rock-shafts, substantially as and for the purpose described.

17. In an automatic passenger-resister, the combination, with the gates F and rock-shafts C′, of the sliding electro-magnets N, bell-crank $n$, crank-arms M, secured to rock-shafts, sliding plates $m^4$, and the connecting-rods $m^3$, all constructed and arranged to operate in the manner and for the purpose described.

18. In an automatic passenger-register, the combination, with the gates F and rock-shafts C′, of the electro-magnets N, secured to suitable registering mechanism, means connected with said rock-shafts for moving said magnets and operating said registering mechanism, batteries connected to said magnets, and two stepping-plates E E E′ E′, armature $n^2$, bell-crank $n$, and means for connecting said stepping-plates, all arranged and operated in the manner and for the purpose described.

19. In an automatic passenger-register, the combination, with gates F, secured to rock-shafts, of the batteries E' E² E³ E⁴, connected to each other, and two stepping-plates E E E' E', electro-magnets N, connected to suitable registering mechanism adapted to be operated thereby, auxiliary-gates H, and a bar or rod for connecting the rock-shafts for the purpose of causing the gates to open simultaneously.

20. In an automatic passenger-register, the combination, with gates F, secured to rock-shafts C', of auxiliary gates H, connected to said rock-shafts, spring J, and chains K, arranged to operate in the manner and for the purpose set forth.

21. In an automatic passenger-register, the combination, with gates F, secured to rock-shafts C', the latter having formed or secured thereon the bearings G, of the auxiliary gates H, also secured to said rock-shafts C' within the bearings G, substantially as set forth.

22. In an automatic passenger-register, registering mechanism constructed with a suitable train of ratchet-wheels contained between plates $o$ $o'$, a sliding plate $o^2$, provided with a cam-slot $o^9$, disk $o^7$, ratchet $r$, pawl $r^2$, and dog $r^4$, constructed and arranged substantially as set forth.

23. In an automatic passenger-register, registering mechanism constructed with a train of ratchets contained between two plates, a sliding plate having secured thereto suitable mechanism for operating said train of wheels when the sliding plate is moved, and a sliding electro-magnet secured to said sliding plate and adapted, when moved, to operate said registering mechanism, substantially as described.

24. In an automatic passenger-register, the combination, with suitable registering mechanism, of a sliding plate indirectly connected with said mechanism and adapted to operate the same, and a sliding electro-magnet connected by a lever to said sliding plate and adapted, when moved, to operate the latter and regisistering mechanism, substantially as described.

25. An automatic passenger-register constructed with gates and suitable registering mechanism operated by said gates, a magnet for rendering inoperative said registering mechanism, a circuit including said magnet, and an electric bell contained in the circuit and arranged to be sounded when the gates are opened without registering, substantially as described.

26. An automatic passenger-register constructed with gates connected with suitable registering mechanism, batteries connected with said registering mechanism, a sliding electro-magnet adapted, when moved, to operate said registering mechanism and simultaneously complete the circuit to a second register, causing the latter to register simultaneously with said former registering mechanism.

27. In an automatic passenger-register, the combination, with a suitable frame, of the sliding magnet N, connected with batteries and having a plate 41 secured thereto, yielding pins 32, connected with said batteries and with an electro-magnet 35, and a register 40, having its operating-lever 37 secured to the armature 36 of said magnet 35 and adapted to be operated by means of the said magnet N, causing the circuit to be completed through said plate 41, substantially as hereinbefore described.

Signed at New York, in the county of New York and State of New York, this 2d day of August, A. D. 1890.

ADRIAN GAJARDO.

Witnesses:
HERMAN GUSTOW,
CYRIL H. C. ARMSTRONG.